(12) United States Patent
Kropfreiter et al.

(10) Patent No.: US 7,422,186 B2
(45) Date of Patent: Sep. 9, 2008

(54) VEHICLE SEAT AND A POWER SEAT ADJUSTER ASSEMBLY FOR A VEHICLE SEAT

(75) Inventors: Scott Kropfreiter, Warren, MI (US); Thomas Rorabacher, Livonia, MI (US); John R. Sims, South Lyon, MI (US); Ryan Kadlec, Oak Park, MI (US); Vien Le, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 67 days.

(21) Appl. No.: 11/276,652

(22) Filed: Mar. 9, 2006

(65) Prior Publication Data
US 2007/0210232 A1 Sep. 13, 2007

(51) Int. Cl.
*F16M 13/00* (2006.01)

(52) U.S. Cl. .............. 248/429; 248/424; 297/311; 297/330; 296/65.15; 296/65.13; 296/65.14

(58) Field of Classification Search .......... 248/424, 248/429; 297/311, 317, 327, 330; 296/65.09, 296/65.01, 65.13, 65.14, 65.15, 65.05
See application file for complete search history.

(56) References Cited

U.S. PATENT DOCUMENTS

| | | | |
|---|---|---|---|
| 1,789,859 A | 1/1931 | Bayles | |
| 5,172,601 A | 12/1992 | Siegrist et al. | |
| 5,342,013 A * | 8/1994 | Ito et al. | 248/429 |
| 5,445,354 A | 8/1995 | Gauger et al. | |
| 5,747,896 A | 5/1998 | Nagai et al. | |
| 5,762,309 A | 6/1998 | Zhou et al. | |
| 6,220,642 B1 * | 4/2001 | Ito et al. | 296/65.14 |
| 6,499,712 B1 * | 12/2002 | Clark et al. | 248/429 |
| 6,676,099 B2 * | 1/2004 | Mallard et al. | 248/429 |
| 6,820,851 B2 | 11/2004 | Mochizuki et al. | |
| 6,971,620 B2 * | 12/2005 | Moradell et al. | 248/422 |
| 6,981,681 B2 * | 1/2006 | Matsumoto | 248/424 |
| 2004/0089784 A1 | 5/2004 | Garrido | |

* cited by examiner

*Primary Examiner*—Gwendolyn Baxter
*Assistant Examiner*—Michael McDuffie
(74) *Attorney, Agent, or Firm*—Brooks Kushman P.C.

(57) ABSTRACT

A vehicle seat and a power seat adjuster assembly for a vehicle seat. The power seat adjuster assembly includes a track assembly having a lead screw and a lead screw constraint.

20 Claims, 2 Drawing Sheets

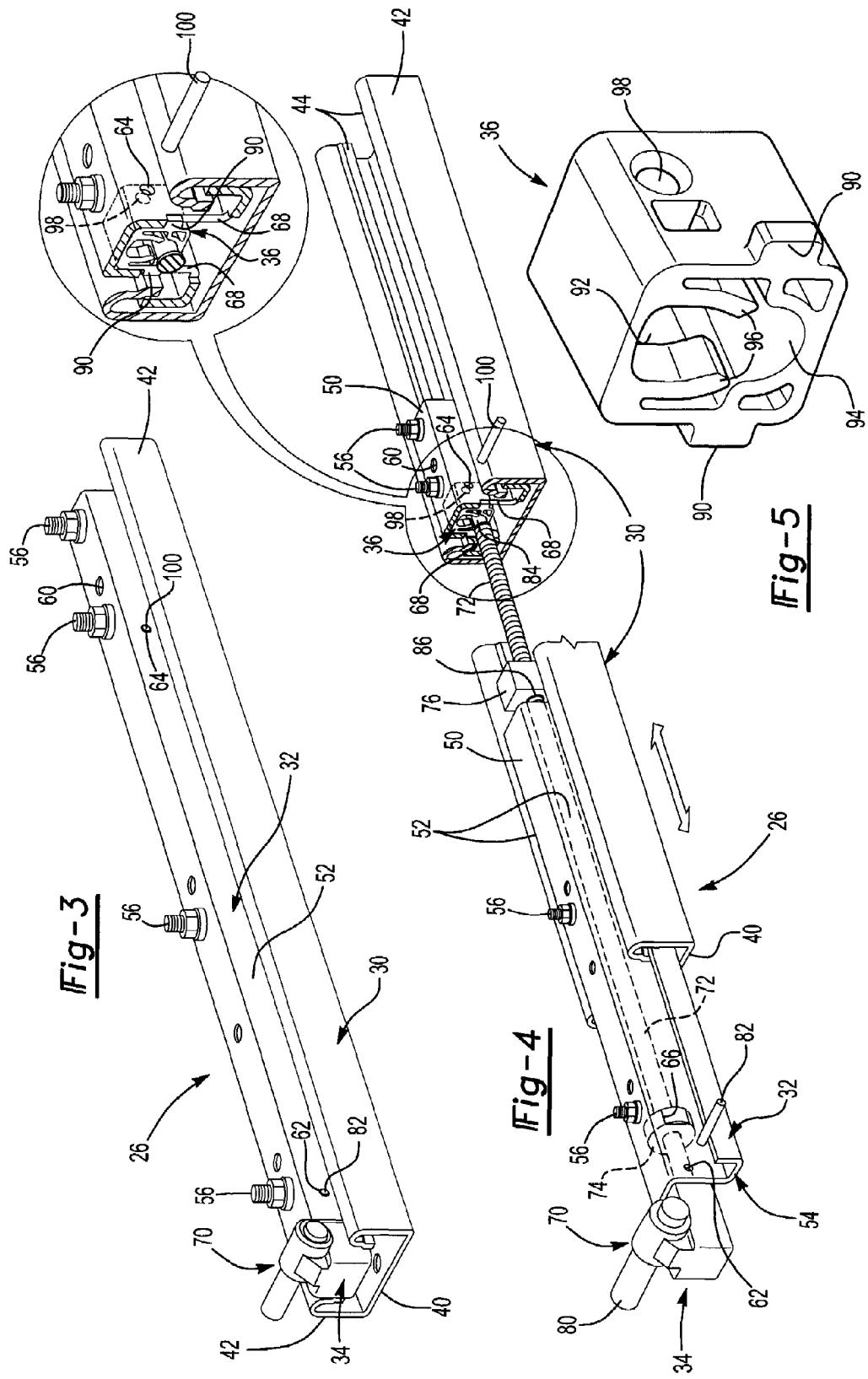

VEHICLE SEAT AND A POWER SEAT ADJUSTER ASSEMBLY FOR A VEHICLE SEAT

BACKGROUND OF THE INVENTION

Field of the Invention

The present invention relates to a power seat adjuster assembly and a vehicle seat having a power seat adjuster assembly.

SUMMARY OF THE INVENTION

In at least one embodiment of the present invention, a vehicle seat is provided. The vehicle seat includes a power seat adjuster assembly. The power seat adjuster assembly includes a track assembly. The track assembly includes an outer track, an inner track, a lead screw, and a lead screw constraint. The inner track defines a channel and is received by the outer track. The lead screw has a distal end disposed in the channel. The lead screw constraint is mounted to the inner track within the channel. The lead screw constraint includes a body having first and second flexible arms. The first and second flexible arms cooperate with the body to define an upper cavity. The lead screw constraint also has a lower cavity disposed adjacent to the upper cavity. The first and second flexible arms flex apart when the lead screw is moved from the upper cavity to the lower cavity and inhibit the lead screw from moving from the lower cavity to the upper cavity.

In at least one other embodiment of the present invention a vehicle seat is provided that includes a power seat adjuster assembly. The power seat adjuster assembly has a track assembly that includes an outer track, an inner track, a lead screw, and a lead screw constraint. The inner track is moveably disposed in the outer track and includes first and second side walls having first and second constraint slots, respectively. The lead screw is disposed between the first and second side walls. The lead screw constraint is mounted within the inner track and adapted to receive the lead screw. The lead screw constraint has first and second tabs extending from first and second exterior surfaces of the body. The first and second tabs are disposed in the first and second constraint slots, respectively, to inhibit movement of the lead screw constraint relative to the inner track.

In at least one other embodiment of the present invention, a power seat adjuster assembly for a seat for a motor vehicle is provided. The power seat adjuster assembly has an upper portion and a track assembly coupled to the upper portion. The track assembly includes an outer track, an inner track, a lead screw, a drive unit, and a lead screw constraint. The outer track is configured to be mounted to the vehicle. The inner track received by and moveably disposed in the outer track and includes a constraint slot. The lead screw extends within the inner track. The drive unit is mounted to the inner track and is configured to rotate the lead screw. The lead screw constraint is mounted to the inner track and adapted to receive the lead screw. The lead screw constraint includes a tab disposed on an exterior surface. Movement of the lead screw constraint is inhibited when the tab is disposed in the slot. Bending of the lead screw is inhibited by the lead screw constraint.

BRIEF DESCRIPTION OF THE DRAWINGS

FIG. 3 is a perspective view of a track assembly that may be provided with the power seat adjuster, the track assembly being shown in a first position.

FIG. 4 is a fragmentary perspective view of the track assembly disposed in a second position.

FIG. 5 is a perspective view of an exemplary lead screw constraint that may be provided with the track assembly.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
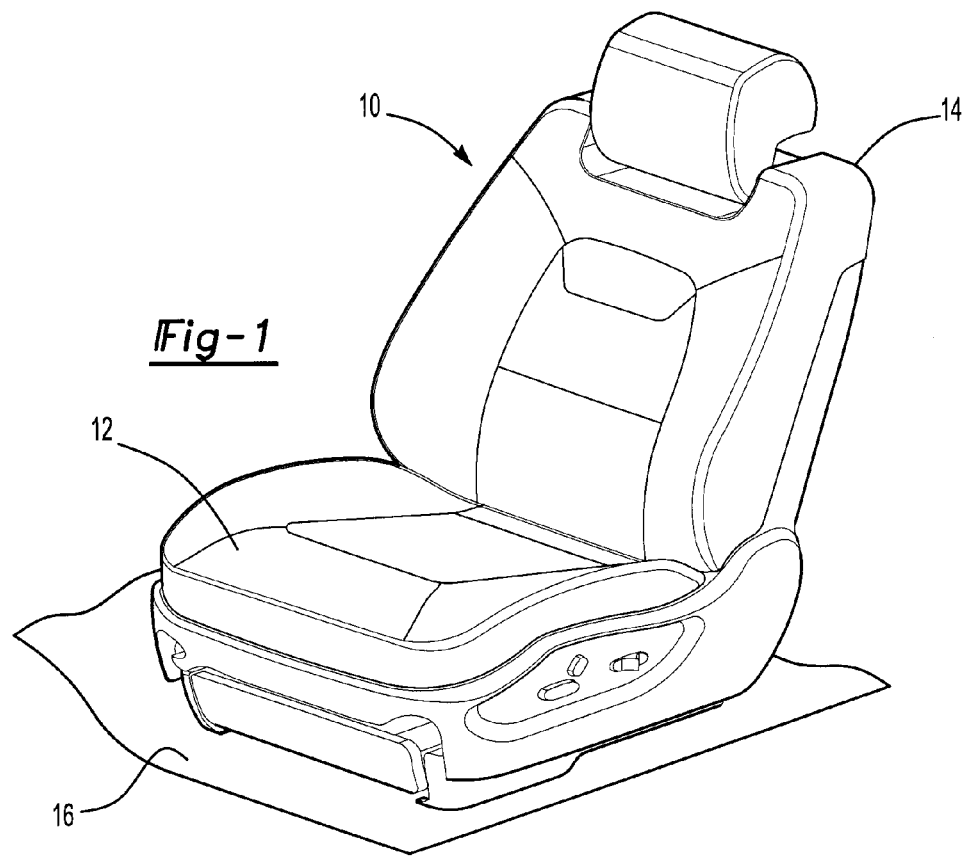
FIG. 1 is a perspective view of an exemplary vehicle seat.

Referring to FIG. 1, an exemplary seat assembly 10 is shown. The seat assembly 10 may be provided in a motor vehicle, such as a car or truck. The seat assembly 10 may include a seat bottom 12 and a seat back 14 pivotally disposed on the seat bottom 12. The seat bottom 12 may be mounted to a surface 16, such as a vehicle floor.

Figure 2:
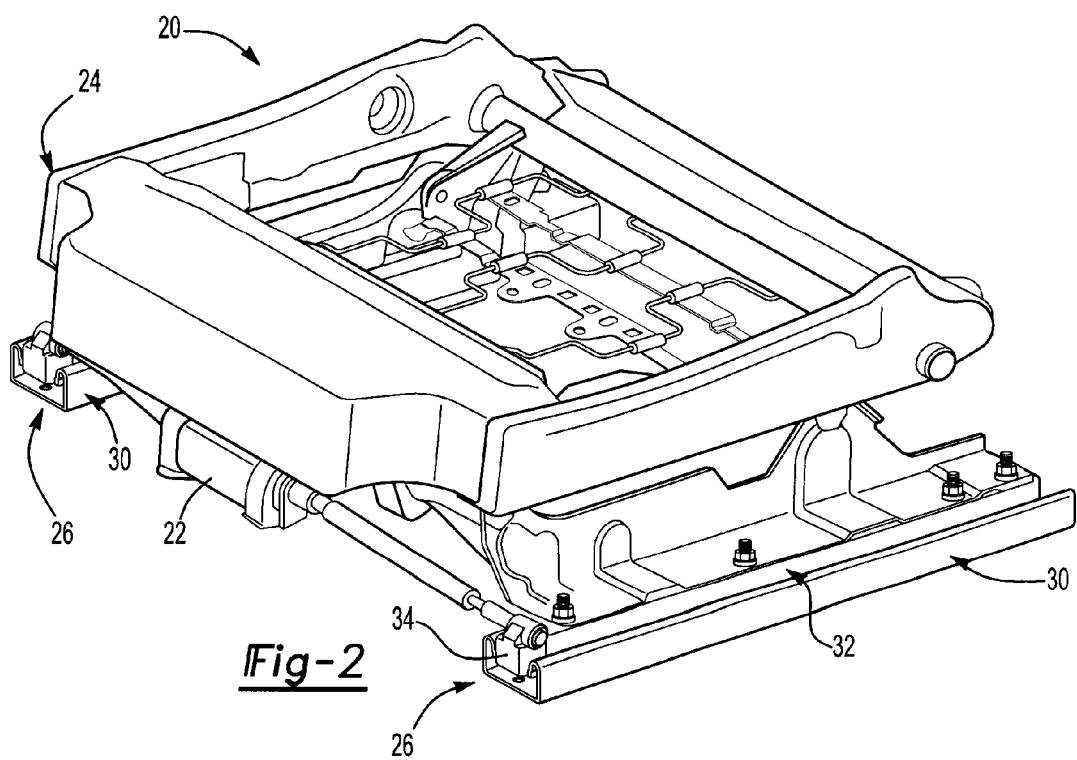
FIG. 2 is a perspective view of the power seat adjuster that may be provided with the vehicle seat.

The seat bottom 12 may be configured to move relative to the mounting surface 16. For example, the seat bottom 12 may include a seat adjuster assembly 20 that facilitates movement of the seat bottom 12 in one or more directions, such as horizontal (fore/aft), vertical (up/down), and/or tilting toward or away from the mounting surface 16. An exemplary seat adjuster assembly 20 is shown in FIG. 2.

The seat adjuster assembly 20 may have any suitable configuration. In the embodiment shown in FIG. 2, the seat adjuster assembly 20 is configured as a power seat adjuster assembly that may utilize one or more actuators, such as a bi-directional electric motor to actuate at least a portion of the seat assembly 10 in one or more directions. The seat adjuster assembly 20 may include an upper portion 24 and one or more track assemblies 26.

The upper portion 24 may be configured to support the seat bottom 12. For example, the upper portion 24 may support a seat cushion, such as a foam pad, that is disposed between the upper portion 24 and a seat occupant. The upper portion 24 and seat cushion may be at least partially concealed by a cover that forms an exterior surface of the seat bottom 12.

One or more track assemblies 26 may be coupled to the upper portion 24. In the embodiment shown in FIG. 2, two track assemblies 26 are shown that are spaced apart from each other and extend in a generally longitudinal direction between the front and back of the seat adjuster assembly and the seat bottom 12. The track assemblies 26 may be configured to facilitate movement of the seat bottom 12 in at least one direction. In the embodiment shown, the track assemblies 26 facilitate movement in a generally fore/aft direction as will be described in more detail below. Each track assembly 26 may include a plurality of components. For example, at least one track assembly 26 may include an outer track 30, an inner track 32, a lead screw assembly 34, and a lead screw constraint 36.

Referring to FIGS. 3 and 4, an exemplary track assembly 26 is shown in more detail. The inner track 32 may move relative to the outer track 30 in the direction generally designated by the double-arrow line shown in FIG. 4. In FIG. 3, the track assembly is shown in a "retracted" or first position in which the inner track 32 may be generally centered within the outer track 30. In FIG. 4, the track assembly 26 is shown in an "extended" or second position, in which the inner track 32 may extend past an end of the outer track 30. For clarity, FIG. 3 shows the track assembly 26 in a generally assembled condition, while FIG. 4 shows portions of the track assembly 26 either disassembled or fragmented to better depict components and features that may otherwise be hidden or concealed in a track assembly 26.

In FIGS. 3 and 4, an exemplary outer track 30 is shown in more detail. The outer track 30 may have any suitable configuration and may be made of any suitable material, such as a metal like steel. In the embodiment shown, the outer track 30 includes a bottom wall 40 and two opposing side walls 42 that extend from opposing ends of the bottom wall 40. The bottom wall 40 and side walls 42 may cooperate to define a generally U-shaped channel that receives the inner track 32. Each side wall 42 may include a hook portion 44 disposed proximate an end that is spaced apart from the bottom wall 40. The hook portion 44 may extend generally toward the bottom wall 40 to help retain the inner track 32 as will be described in more detail below. The outer track 30 may be coupled to the mounting surface 16 in any suitable manner, such as with one or more fasteners.

The inner track 32 may be received by and be configured to move within the outer track 30. The inner track 32 may have any suitable configuration and may be made of any suitable material, such as a metal like steel. As is best shown in FIG. 4, the inner track 32 may include an upper wall 50 and two opposing side walls 52 that extend from opposing ends of the upper wall 50. The upper wall 50 and side walls 52 may cooperate to define a channel having an open side that faces toward the bottom wall 40 of the outer track 30. Each side wall 52 may also include a hook portion 54 disposed proximate an end that is spaced apart from the upper wall 50. The hook portion 54 may extend away from the channel and generally toward the upper wall 50. As such, the hook portion 54 of the inner track 32 may be generally received by the hook portion 44 of the outer track 30, thereby inhibiting the inner track 32 from disengaging or being lifted out of the outer track 30. Optionally, at least one of the hook portions 44, 54 may receive or engage bearings that help facilitate movement of the inner track 32 relative to the outer track 30. For instance, the hook portions 44, 54 may cooperatively engage ball or roller bearings positioned therebetween that facilitate movement or help space apart the outer and inner tracks 30, 32.

One or more mounting features 56, such as threaded studs, may be provided on the inner track 32 to facilitate mounting of the track assembly 26 to the upper portion 24 of the seat adjuster assembly 20. The mounting features 56 may be disposed adjacent to the upper wall 50 and may be attached in any suitable manner, such as by welding or press fitting.

The inner track 32 may also include various openings or apertures. For example, the upper wall 50 may include a through hole or tool aperture 60 that facilitates positioning a portion of the lead screw assembly 34 relative to the lead screw constraint 36 as will be discussed in more detail below. At least one side wall 52 may include first and/or second holes 62, 64 that facilitate mounting of the lead screw assembly 34 and a lead screw constraint 36, respectively. In addition, at least one side wall 52 may include a retainer slot 66 and/or a constraint slot 68 that are configured to retain a portion of the lead screw assembly 34 and the lead screw constraint 36, respectively, as will be described in more detail below. The constraint slot 68 may be open-ended and generally extend from a lower surface of the inner track 32 toward the upper wall 50. In the embodiment shown, each side wall 52 includes a first hole 62, a second hole 64, a retainer slot 66, and a constraint slot 68 that are generally aligned with a corresponding hole or slot on the opposing side wall 52. In FIG. 4, the track assembly 26 is fragmented along an edge or side of the constraint slot 68 to better illustrate the constraint slot 68 and internal features of the track assembly 26.

The lead screw assembly 34 is adapted to actuate the inner track 32 relative to the outer track 30. The lead screw assembly 34 may include a gearbox or power drive unit 70, a lead screw 72, a load holder 74, and a drive nut 76.

The power drive unit 70 may be adapted to rotate the lead screw 72 to actuate the seat bottom 12. The power drive unit 70 may include an input portion 80 and an output portion. The input portion 80 may be coupled to and receive torque from the actuator 22. The power drive unit 70 may include one or more gears that transmit the torque to the lead screw 72 in a manner known by those skilled in the art. The power drive unit 70 may be coupled to the inner track 32 in any suitable manner, such as with a fastener 82 like a roll pin that extends through the first holes 62 in the inner track 32 and a corresponding hole in the power drive unit 70. As such, the power drive unit 70 may accompany the inner track 32 when the inner track 32 moves relative to the outer track 30. The fastener 82 is shown in an assembled position in FIG. 3 and in a disassembled condition or exploded view in FIG. 4.

The lead screw 72 may extend from the power drive unit 70 into the channel in the inner track 32. The lead screw 72 may be coupled to the output portion of the power drive unit 70 in any suitable manner, such as with a coupling. At least a portion of the lead screw 72 may include one or more external threads that engage the drive nut 76. In addition, the lead screw 72 includes a distal end 84 disposed opposite the power drive unit 70 that may be tapered.

The load holder 74 may have any suitable configuration. In at least one embodiment, the load holder 74 may be generally ring shaped. The load holder 74 may be fixedly coupled to the lead screw 72 in any suitable manner, such as by crimping. At least a portion of the load holder 74 may extend through one or more openings in the inner track 32, such as the retainer slots 66. As such, the load holder 74 may inhibit the lead screw 72 from sliding out of the inner track 32 in response to high load conditions, such as those that may occur during a vehicle impact event.

The drive nut 76 may be at least partially disposed in the channel in the inner track 32. In at least one embodiment, the drive nut 76 may be generally block shaped and include a threaded aperture 86 that receives one or more mating threads on the lead screw 72. The drive nut 76 may also be fixedly coupled to the outer track 30 in any suitable manner, such as with one or more fasteners or by welding. In the embodiment shown, the drive nut 76 is fixedly coupled to the bottom wall 40 of the outer track 30. As such, rotation of the lead screw 72 imparts force against the drive nut 76 to move the inner track 32 along the outer track 30.

The lead screw constraint 36 may be adapted to receive a portion of the lead screw 72 to help inhibit objectionable noises, such as rattling of the lead screw 72. Moreover, the lead screw constraint 36 may help position and inhibit bending of the lead screw 72. Bending of the lead screw 72 may result in binding of the lead screw 72 and the drive nut 76 and improper operation of the seat adjuster assembly 20. Such bending may occur during assembly, such as during the assembly of the inner track 32 and the outer track 30.

Referring to FIG. 5, an exemplary lead screw constraint 36 is shown in more detail. The lead screw constraint 36 may be made of any suitable material, such as a polymeric material like PTFE (polytetrafluoroethylene), and may have any suitable configuration. For example, the lead screw constraint 36 may include one or more alignment tabs 90, an upper cavity 92, a lower cavity 94, one or more flexible arms 96, and one or more mounting holes 98. In the embodiment shown in FIG. 5, two alignment tabs 90 and two flexible arms 96 are provided. The lead screw constraint 36 may also include additional holes or recesses that help reduce weight and inhibit warpage.

The alignment tabs 90 extend from opposing exterior surfaces of the lead screw constraint 36. Each tab 90 may be received in a corresponding constraint slot 68 in the inner track 32, thereby facilitating alignment, positioning, and/or retention of the lead screw constraint 36 relative to the inner track 32. In FIG. 4, the alignment tabs 90 are shown near an end of a corresponding constraint slot 68 that has an open end disposed near the bottom wall 40 of the outer track 30. The present invention also contemplates embodiments in which one or more alignment tabs 90 are omitted or provided in different sizes, orientations, and configurations. For example, an alignment tab may be provided on an upper surface of the lead screw constraint 36 and engage a corresponding hole in the upper wall 50 of the inner track 32. Alternatively, one or more alignment tabs 90 may be provided in an offset configuration or configured with retention features that couple the lead screw constraint 36 to the inner track 32.

The upper cavity 92 may be adapted to receive the distal end 84 of the lead screw 72 during assembly. In the embodiment shown, the upper cavity 92 is sized to accommodate the lead screw 72 and extends approximately halfway through the body of the lead screw constraint 36. Alternatively, the upper cavity 92 may extend through the lead screw constraint 36 to a greater or lesser degree. In at least one embodiment, the upper cavity 92 may extend completely through the lead screw constraint 36.

The lower cavity 94 may be provided adjacent to the upper cavity 92. In the embodiment shown, the lower cavity 94 is sized to accommodate the lead screw 72 and extends completely through the body of the lead screw constraint 36. Alternatively, the lower cavity 94 may extend through the lead screw constraint 36 to a greater or lesser degree than depicted in FIG. 5.

The flexible arms 96 are configured to facilitate positioning of the lead screw 72 within the lead screw constraint 36. More specifically, the flexible arms 72 are configured to help support the distal end 84 of the lead screw 72 when the lead screw is disposed in the upper cavity 92. Moreover, the flexible arms 72 are adapted to flex away from each other to permit the lead screw 72 to be moved or repositioned from the upper cavity 92 to the lower cavity 94 and to inhibit movement of the lead screw 72 from the lower cavity 94 to the upper cavity 92. As such, the flexible arms 96 are configured to facilitate one-way positioning of the lead screw 72. The flexible arms 96 may have any suitable configuration. In the embodiment shown, the flexible arms 96 are curved toward each other and cooperate with the body of the lead screw constraint 36 to help define the upper cavity 92 within the concave flexible arm surfaces. In addition, the ends of the flexible arms 96 help define part of the upper region of the lower cavity 94.

The lead screw constraint 36 may be coupled to the inner track 32 in any suitable manner, such as with a fastener 100 like a roll pin that extends through the second holes 64 in the inner track 32 and one or more mounting holes 98 in the lead screw constraint 36. The fastener 100 is shown in an assembled position in FIG. 3 and in a disassembled condition or exploded view in FIG. 4. In the embodiment shown, a single mounting hole 98 is provided that extends through the lead screw constraint 36. Alternatively, multiple holes may be provided, such as in embodiments in which the upper cavity 92 extends through the body of the lead screw constraint 36. Optionally, a fastener such as a flanged roll pin, headed fastener, or nut and bolt may be employed to secure the lead screw constraint 36 and/or provide additional structural reinforcement to inhibit the side walls 52 of the inner track 32 from flexing or bending away from each other.

The track assembly 26 may be assembled in any suitable manner. One example of an assembly sequence includes the following steps. First, the lead screw constraint 36 is positioned in the inner track 32 such that one or more tabs 90 are received by one or more corresponding constraint slots 68 as previously described. Second, the lead screw assembly 34 is positioned relative to the inner track 32 such that the lead screw 72 extends within the channel and the distal end 84 is disposed proximate the upper cavity 92 of the lead screw constraint 36. Third, the lead screw assembly 34 and the lead screw constraint 36 are coupled to the inner track 32. Fourth, the inner track 32 is inserted into the outer track 30. Fifth, the drive nut 76 is coupled to the outer track 30. Sixth, the lead screw 72 is repositioned from the upper cavity 92 into the lower cavity 94 of the lead screw constraint 36. Repositioning may be accomplished by inserting a tool (e.g., rod, shaft, screwdriver, punch, or the like) through the tool aperture 60 in the inner track 32 and exerting force against the lead screw 72 with the tool to push the lead screw 72 past the flexible arms 96 and into the lower cavity 94. Alternatively, repositioning may be accomplished in one or more embodiments of the present invention by rotating the lead screw 72 to move the drive nut 76 sufficiently close to the lead screw constraint 36 to bias the lead screw 72 from the upper cavity 92 into the lower cavity 94. Of course, the present invention also contemplates various alternative sequences and/or combinations of assembly steps. For example, the lead screw assembly 34 may be positioned in the inner track 32 before positioning the lead screw constraint 36 in the inner track 32. In addition, the lead screw assembly 34 and lead screw constraint 36 may be coupled to the inner track 32 at any suitable point after they are positioned relative to the inner track 32. Also, the lead screw assembly 34 may be positioned and coupled after the inner track 32 is inserted into the outer track 30 in one or more embodiments of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat adjuster assembly comprising:
    an outer track,
    an inner track associated with the outer track, the inner track defining a channel,
    a lead screw, and
    a lead screw constraint mounted to the inner track within the channel, the lead screw constraint including:
        first and second flexible arms that at least partially define an upper cavity, and
        a lower cavity disposed adjacent to the upper cavity;
    wherein the first and second flexible arms flex apart when the lead screw is moved from the upper cavity to the lower cavity and inhibit the lead screw from moving from the lower cavity to the upper cavity.

2. The seat adjuster assembly of claim 1 wherein the upper cavity extends partially through the lead screw constraint and the lower cavity extends completely through the lead screw constraint.

3. The seat adjuster assembly of claim 1 wherein the lead screw constraint further comprises a tab disposed on an exterior surface and extending away from the upper and lower cavities.

4. The seat adjuster assembly of claim 3 wherein the inner track further comprises a slot that receives the tab.

5. The seat adjuster assembly of claim 1 wherein the lead screw constraint further comprises a mounting hole that extends through the lead screw constraint and is oriented generally perpendicular to the lead screw.

6. The seat adjuster assembly of claim 5 wherein the inner track further comprises a hole that is coaxially aligned with the mounting hole to receive a fastener that couples the lead screw constraint to the inner track.

7. The seat adjuster assembly of claim 1 wherein the inner track further comprises a tool hole, the tool hole being disposed proximate a distal end of the lead screw and adapted to receive a tool that engages the lead screw to displace the distal end from the upper cavity to the lower cavity.

8. The seat adjuster assembly of claim 1 further comprising a drive nut through which the lead screw extends, the drive nut being mounted to the outer track.

9. The seat adjuster assembly of claim 8 wherein a distal end of the lead screw is displaced from the upper cavity to the lower cavity when the drive nut is disposed sufficiently close to the lead screw constraint.

10. A seat adjuster assembly comprising:
    an outer track,
    an inner track moveably disposed in the outer track, the inner track including first and second ends and first and second side walls, respectively,
    a lead screw disposed between the first and second side walls, and
    a lead screw constraint mounted to the inner track that does not cover either of the first and second ends, the lead screw constraint having an arm that at least partially defines an upper cavity, and a lower cavity disposed adjacent to the upper cavity;
    wherein the lead screw contacts the arm when the lead screw is moved from the upper cavity to the lower cavity.

11. The seat adjuster assembly of claim 10 wherein the lead screw constraint further comprises first and second flexible arms that at least partially define the upper cavity.

12. The seat adjuster assembly of claim 11 wherein the first and second flexible arms flex apart to permit the lead screw to move from the upper cavity to the lower cavity.

13. The seat adjuster assembly of claim 12 wherein the first and second flexible arms inhibit the lead screw from moving from the lower cavity to the upper cavity.

14. The seat adjuster assembly of claim 10 wherein the lead screw constraint is coupled to the inner track with a fastener.

15. The seat adjuster assembly of claim 10 wherein the lead screw constraint inhibits rattling of the lead screw when the lead screw is disposed in the lower cavity.

16. The seat adjuster assembly of claim 10 wherein the lead screw constraint inhibits bending of the lead screw when the lead screw is disposed in the lower cavity.

17. A seat adjuster assembly for a seat for a vehicle, the seat adjuster assembly comprising:
    a track assembly including:
        an outer track configured to be mounted to the vehicle,
        an inner track received by and moveably disposed in the outer track,
        a lead screw that extends within the inner track,
        a drive unit mounted to the inner track and configured to rotate the lead screw,
        a lead screw constraint mounted to the inner track and adapted to receive the lead screw, the lead screw constraint including upper and lower cavities disposed along different sides of first and second flexible arms, and
        a fastener that extends at least partially through the inner track and the lead screw constraint;
    wherein movement of the lead screw from the lower cavity to the upper cavity is inhibited by the first and second flexible arms.

18. The seat adjuster assembly of claim 17 wherein the upper cavity extends partially through the lead screw constraint and the lower cavity extends through the lead screw constraint.

19. The seat adjuster assembly of claim 17 wherein the first and second flexible arms flex apart when the lead screw is moved from the upper cavity to the lower cavity.

20. The seat adjuster assembly of claim 17 wherein the first and second flexible arms are curved toward each other.

* * * * *